United States Patent
Byers et al.

(10) Patent No.: US 9,875,660 B2
(45) Date of Patent: Jan. 23, 2018

(54) MULTI-MODAL UAV CERTIFICATION

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph Michael Clarke, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/083,239

(22) Filed: Mar. 28, 2016

(65) Prior Publication Data

US 2017/0278410 A1 Sep. 28, 2017

(51) Int. Cl.
*G08G 5/00* (2006.01)
*B64C 39/02* (2006.01)

(52) U.S. Cl.
CPC ......... *G08G 5/0073* (2013.01); *B64C 39/024* (2013.01); *G08G 5/0004* (2013.01)

(58) Field of Classification Search
CPC ... G08G 5/0073; G08G 5/0004; B64C 39/024
See application file for complete search history.

(56) References Cited

U.S. PATENT DOCUMENTS

| 9,305,280 | B1* | 4/2016 | Berg | G06Q 10/083 |
| 2016/0180719 | A1* | 6/2016 | Wouhaybi | G08G 5/0082 |
| | | | | 701/4 |

* cited by examiner

*Primary Examiner* — Michael D Lang
(74) *Attorney, Agent, or Firm* — Ronald Fernando

(57) ABSTRACT

In one embodiment, a method includes receiving flight path data regarding the presence of an unmanned aerial vehicle (UAV) at a location at a future time, detecting the presence of the UAV at the location at the future time, determining radio identity data of the UAV using a radio mode of identification, determining optical identity data of the UAV using an optical mode of identification, and certifying the UAV based on a comparison of the radio identity data and the optical identity data to the flight path data.

20 Claims, 7 Drawing Sheets

MULTI-MODAL UAV CERTIFICATION

TECHNICAL FIELD

The present disclosure relates generally to certification of unmanned aerial vehicles, and in particular, to systems, methods and apparatuses enabling certification of unmanned aerial vehicles using multiple modes of identification.

BACKGROUND

The ongoing development, maintenance, and expansion of air traffic control systems involve an increasing number of unmanned aerial vehicles, autonomous aerial vehicles, and drones (collectively referred to as UAVs). To that end, it is important to insure that such UAVs are positively identified and immune from hacking and spoofing.

Lacking sufficient safeguards, someone seeking to steal commercial goods could equip an UAV with false identification marking or signals, pick up a load of cargo belonging to someone else, and deliver the load to any location in range, effectively stealing the load. Surveillance UAVs could be misused by a person either by falsely commanding another person's UAV to go to an unintended location or by commanding their own UAV to go to an unauthorized location. People who object to UAV operations could jam or falsify UAV command streams, causing them to crash. People could hijack UAVs, swap their payloads with dangerous materials, and pilot the UAV to any location in the guise of being a something innocuous, such as a pizza delivery. Accordingly, systems and methods are desired to minimize these and other threats.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
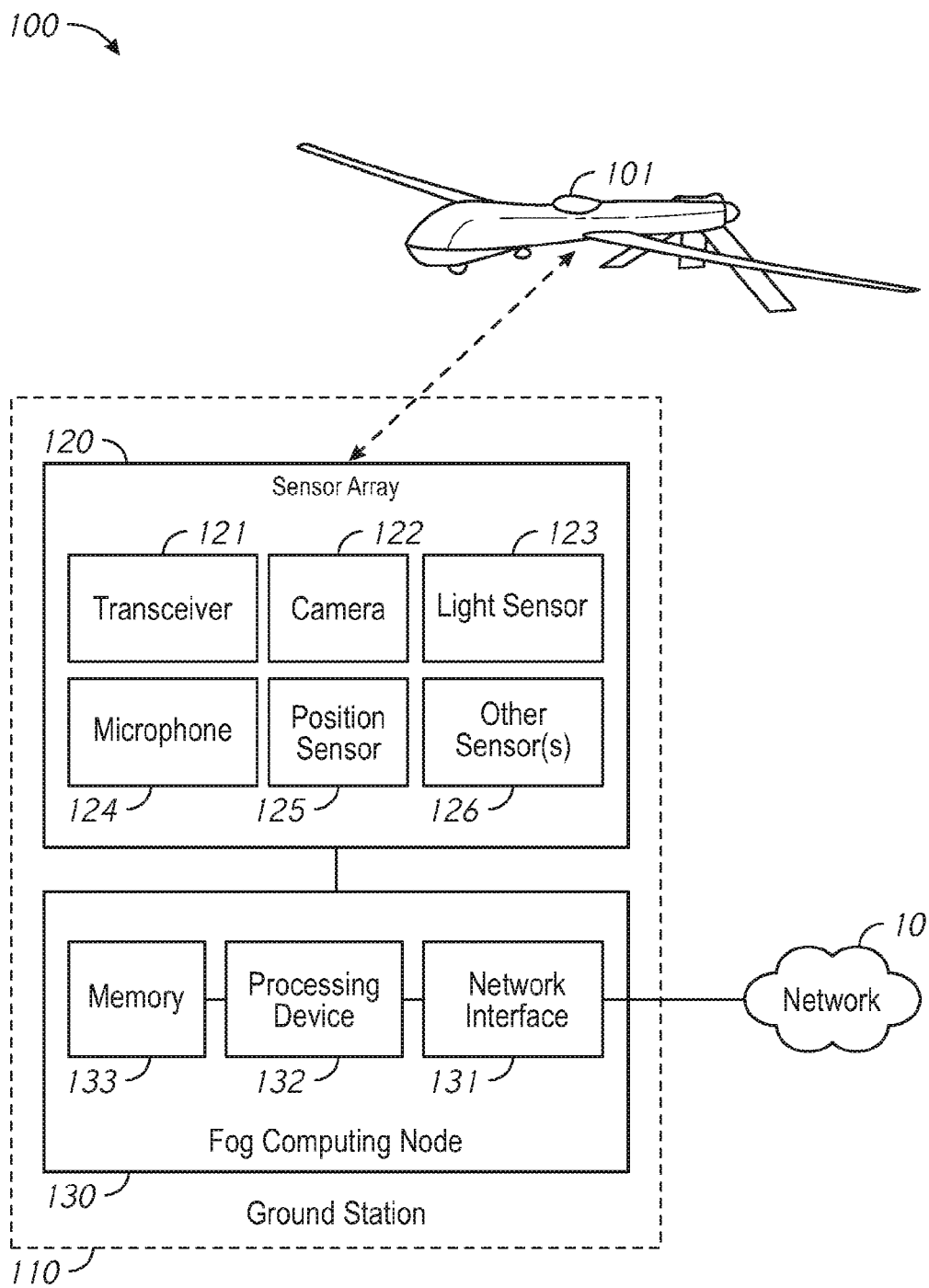
FIG. 1 is a block diagram of certification system in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for detecting and certifying UAVs. For example, in some implementations, a method includes receiving flight path data regarding the presence of an unmanned aerial vehicle (UAV) at a location at a future time, detecting the presence of the UAV at the location at the future time, determining radio identity data of the UAV using a radio mode of identification, determining optical identity data of the UAV using an optical mode of identification, and certifying the UAV based on a comparison of the radio identity data and the optical identity data to the flight path data.

In other implementations, a method includes retrieving identity information of an UAV and modulating an intensity of one or more indicator lights of the UAV based on the identity information.

EXAMPLE EMBODIMENTS

Many jurisdictions are wrestling with how to ensure the safety of UAVs in their airspace. A first step in that process is to ensure that individual UAVs can be uniquely identified and that their command and telemetry system are immune from (or at least resistant to) compromise by pranksters, hackers, jammers, or criminal elements.

Thus, one key challenge is the positive identification of individual UAVs. In full-size aircraft, permanent tail numbers that uniquely identity the craft can be easily cross-referenced to determine information such as its owner, capabilities, flight envelope, etc. Because of the small size of some UAVs, visual tail numbers may be of limited use. Full-size aircraft can also include radio transponders that can be interrogated to squawk a response that includes a unique Air Traffic Control (ATC) assigned identification. UAVs, especially those operating in tight formations in flocks can have difficulties in use of such systems.

It is desirable that many types of ground stations (including landing perches, landing roosts, sensor platforms, airport radar systems, sensitive installations, no-fly zones, observers with cameras, etc.) and manned aircraft sharing the airspace be able to positively identify UAVs in range. Similarly, it is desirable that UAVs in flight be able to positively identify ground installations they interact with to prevent spoofing of potential landing sites, network terminals, sensors, and control authorities.

Another key challenge is to prevent spoofing of the command uplink and telemetry downlink traffic to and from each UAV. There may be significant commercial and safety risks if both directions of communication between UAVs and ground stations can be compromised. It is desirable that UAV-to-UAV traffic (which can be used for control of spacing, management of formations, and requesting priority passage) also be highly secure.

A third challenge is the detection of any falsification at any physical or virtual level of the UAV network. While various cryptographic systems may be able to provide adequate confidence that a UAV is what it says it is, and is responding correctly to only its authorized commands, there may be potential for UAVs to deviate from their intended purpose and flight plans. There may be sensors and observers on the ground and in other aircraft capable of discovering and reporting these deviations, and it may be desirable for a system to correlate reports and allow the UAV network to take swift and appropriate actions to eliminate, or at least contain any potential threats.

It is also desirable for UAV-to-manned aircraft communication to include security in the same manner. For example, if a UAV detects manned traffic head on, the UAV, like the other aircraft, can be programmed to maneuver to the right. It may be desirable for the UAV to be able to detect traffic and move appropriately, as a human pilot of a manned aircraft may not know what the UAV would otherwise do. Positive identity of individual flying objects in a crowded sky (manned and unmanned) is desirable to preserve the safety and security of the airways.

Thus, it is desirable to implement highly robust and trustworthy systems and method to identify individual UAVs, e.g., using various modes of generating identification information from a distance. Also, it is desirable for systems and methods to ensure that command and telemetry traffic to and from a specific UAV only be accessible to that UAV and its authorized ground control network, and spoofing and falsification of this traffic must be difficult and/or easy to detect if it happens. Described below are such systems and methods for ensuring these (and other) objectives.

As described above, it is desirable for UAVs and the ground stations that support them be positively identified in ways that cannot be misinterpreted or spoofed. Although the identification systems and methods are described below primarily in the context of a ground station certifying a UAV, it is to be appreciated that various aspects can also be used by any of a UAV, a manned aircraft, or a ground station to certify a UAV airframe, any cargo modules they may carry, landing perches and roosts, ground communication equipment, airspace surveillance equipment, and manned aircraft.

FIG. 1 is a block diagram of certification system 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the certification system 100 includes a UAV 101 and a ground station 110 connected to a network 10. The network 10 includes any public or private LAN (local area network) and/or WAN (wide area network), such as an intranet, an extranet, a virtual private network, a cellular, cable or satellite network, and/or portions of the Internet. Although FIG. 1 shows a single UAV 101 and a single ground station 110, it is to be appreciated that the certification system 100 can include multiple ground stations connected to the network 10, each capable of certifying multiple UAVs.

The ground station 110 can be, for example, a landing perch, a landing roost, an airport radar system, a sensor platform, or any UAV observer. The ground station 110 includes a fog computing node 130 which receives data from a sensor array 120. The fog computing node 130 includes a network interface 131 for sending and receiving data over the network 10. The fog computing node 130 further includes a processing device 132 and a memory 133. As is typical of a fog computing node, the fog computing node 130 (e.g., the processing device 132) can include multiple processing devices at various locations. Similarly, the memory 133 can include multiple storage devices at various locations.

The sensor array 120 includes one or more of a variety of sensors. In various implementations, the sensor array 120 includes a transceiver 121 configured to wirelessly receive (and, in some embodiments, transmit) a radio frequency data signal to (and, in some embodiments, from) the UAV 101. To that end, the transceiver 121 can include, for example, a radio-frequency antenna, a baseband system, a modulator, a demodulator, and other components. In some implementations, the transceiver 121 includes one or more of an omnidirectional transceiver or a directional transceiver.

In various implementations, the sensor array 120 includes a camera 122 for generating an image of the UAV 101. In various implementations, the sensor array 120 includes a light sensor 123 for detecting an intensity of a light emitted by the UAV 101. In some embodiments, the light sensor 123 is implemented as the camera 122 with appropriate image processing (e.g., as performed by the fog computing node 130). In some implementations, the camera 122 includes a fisheye lens pointed skyward.

In various implementations, the sensor array 120 includes a microphone 124 for detecting sound generated by the UAV 101. In various implementations, the sensor array 120 includes a position sensor 125 for detecting a position of the UAV 101. Detecting the position of the UAV can include detecting the presence of the UAV 101 at a location. The location can include both ground position and altitude components. In various implementations, the sensor array 120 includes other sensors 126 for detecting information about the UAV 101.

The ground station 110 is configured to certify detected UAVs using multiple modes of identification. Each of the multiple modes of identification use different information received from the sensor array 120. Advantageously, using multiple modes of identification can significantly increase the difficulty of spoofing, hacking, or jamming the certification system 100.

One mode of identification is an optical mode of identification. A visual computer-readable tag indicating a UAV identifier of the UAV 101 can be displayed upon the UAV 101. The computer-readable tag can be, for example, alphanumeric text (e.g., a tail number), a one-dimensional barcode, or a two-dimensional barcode (e.g., a QR code). The ground station 110 can detect the computer-readable tag in an image of the UAV 101 generated by the camera 122 and can decode the computer-readable tag to determine the UAV identifier of the UAV 101.

Having a computer-readable tag displayed upon the UAV 101 can confer a number of advantages. Humans and machines can view these markings (perhaps with the aid of long-range optics and their smart handheld devices), and identify the UAV 101 by its tail number, barcode, or QR code. Also, anytime the UAV 101 appears in a camera image (which may be a very frequent occurrence), the certification system 100 can use OCR techniques to convert the image to a UAV identifier, which can be used by various air traffic control systems for positive identification. Ground assets like landing roosts and perches can also have unique identifiers, either as numerical codes or machine-readable markings like QR codes.

In various implementations, there may not be enough space on a UAV for display of a computer-readable tag that can be read from the ground. Also, UAVs can operate at high speeds and/or at night or other conditions of decreased viability, where reading a computer-readable tag might be difficult. Further, tail numbers and QR codes are easily spoofed, if someone wanted to deliberately misrepresent a UAV's identification.

Another mode of identification is also an optical mode of identification. The UAV 101 can include indicator lights that can be modulated in intensity and/or color to encode information. The UAV 101 can modulate the intensity and/or color of the indicator lights to encode, for example, a UAV identifier and/or telemetry information. The ground station 110 can detect one or more modulated light streams from the UAV 101 using the camera 122 and/or the light sensor 123 and demodulate the one or more modulated light streams to determine the UAV identifier of the UAV 101.

The indicator lights can, thus, serve a dual function. Firstly, the indicator lights can function as visual markers for human pilots and ground observers. Secondly, the intensity and/or color of the light emitted by the indicator lights can be modulated with data bit streams to provide identification and/or flight status information.

If the modulation were performed at a bit rate similar to the frame rate of the cameras typically used to observe the UAVs, data links can be established, and decoded into message streams with image processing software. At a reasonable modulation rate of 60 baud, and simple optical encoding, a 6-character (6-bit per character) tail number could be conveyed about twice per second. Of course, faster modulation schemes could be possible (up to megabits per second using typical LEDs) and specialized optical receivers with steerable optics could be implemented within the light sensor 123.

One mode of identification is a radio mode of identification. The UAV 101 can include a radio transceiver that transmits a radio-frequency (RF) data signal. The RF data signal can include one or more telemetry packets. Each of the one of more telemetry packets can include a UAV identifier of the UAV 101. Each of the one or more telemetry packets can further include at least one of a position of the UAV 101, an altitude of the UAV 101, a speed of the UAV 101, or a direction of the UAV 101. The telemetry packets can include additional information, such as a payload of the UAV 101, a type of the UAV 101, or a status of the UAV 101 (e.g., a fuel level or battery charge level). Thus, the ground station 110 can receive one or more telemetry packets from the UAV 101 (e.g., using the transceiver 121 of the sensor array 120) and, thus, receive the UAV identifier of the UAV 101.

The UAV 101 can use high accuracy positional information and persistent IP connections to continuously report its identity, position, altitude, and velocity (and perhaps additional parameters). In some implementations, the UAV 101 uses its own GPS signal (perhaps augmented by differential capabilities) or optical terrain matching capabilities to determine its position. Further, the UAV 101 uses its air-ground link to periodically (for example, once per second) send a packet of encrypted telemetry information to the ground. If the air-ground IP network is not reliable, the UAV 101 can employ Automatic Dependent Surveillance Broadcast (ADS-B) gear to relay navigational information that could be used by other UAVs, other manned aircraft, and ground stations to identify UAVs in a consistent manner.

Another mode of identification is also a radio mode of identification. As mentioned above, the UAV 101 can include a radio transceiver that transmits a radio-frequency (RF) data signal. In some embodiments, the radio transceiver can also receive a radio-frequency (RF) data signal. Thus, the ground station 110 can transmit an interrogation message to the UAV 101 (e.g., via the transceiver 121) and receive a response to the interrogation message from the UAV 101 (e.g., via the transceiver 121). The response to the interrogation message can include a UAV identifier of the UAV 101. The interrogation-response method of identification can be augmented with telemetry data and secured with modern cryptographic techniques. In implementations in which that the transceiver 121 includes a highly directional radio antenna (e.g., a steerable radar dish), only UAVs within a comparatively narrow beam angle would receive the interrogation message and respond, reducing the susceptibility of the certification system 100 to spoofing or interference, and increasing confidence in bearing and altitude readings for the UAV 101.

As mentioned above, the transceiver 121 can receive telemetry packets and/or responses to interrogation messages. In some implementations, the transceiver 121 includes an omnidirectional transceiver for receiving telemetry packets and/or a directional transceiver (such as a phased-array or steerable dish antenna) for receiving responses to interrogation messages.

Identification modes involving a response to an interrogation message, telemetry packets, and/or modulated light streams can all use cryptographic techniques to authenticate their bit streams. Before the response is modulated for transmission, the UAV 101 can encrypt the response, e.g., using PKI cryptography. The encryption keys can include components unique to the UAV 101. The encryption keys can also include components of flight plan data (e.g., portions of a flight plan certificate which changes for each leg of a flight). In some embodiments, the UAV 101 alternates sending encrypted and clear-channel versions of their identification signals. Receivers without critical needs may not have the decryption keys, but would receive the clear channel versions with normal expectations about security and authenticity of the identity of the UAV 101. Critical receivers could be issued the appropriate decryption keys, decrypt the encrypted transmissions, and have much higher confidence in the authenticity of the identity of the UAV 101. In highly critical implementations, more advanced cryptographic techniques like block chain could be used to further enhance security.

As noted above, FIG. 1 illustrates a single ground station 110, but it is to be appreciated that the certification system 100 can include multiple ground stations. If multiple ground stations (or a combination of ground stations, other UAVs, and manned aircraft) can observe the same UAV 101 simultaneously, the certification system 100 can correlate these observations to ensure that false observations from hacked sensors do not compromise the overall system. Spoofing such a multi-mode system will be difficult, as multiple subsystems of a UAV, multiple observation platforms, and multiple encryption keys would have to be compromised. Using combinations of optical and radio identification modes also makes the system robust in inclement weather, or in the presence of RF interference (natural or jamming).

The use of multiple ground stations (or a combination of ground stations, other UAVs, portable sensing instruments including smartphones, and manned aircraft) allows the use of cooperative audit techniques that can detect security compromises in the certification system 100. In some embodiments, each UAV or ground station scans nearby airspace for the identification signals from other nearby UAVs. The results of these scans (potentially along with identity information of the asset making the scans) are reported to the certification system 100. The certification system 100 correlates the audit reports for a given area, and determines if the UAVs operating in the area are correctly authorized to be there, are operating with normal flight parameters, and are bearing authentic identification information.

Although a rogue UAV probably would "go dark" and not respond to interrogation or broadcast any identity signals, another UAV or ground station is likely to detect it in operation using its optical or acoustic sensors, note the absence of valid identification and/or telemetry streams, report it to the certification system 100, and help raise the alarm.

As noted above, the ground station 110 includes a fog computing node 130 and can use fog computing techniques to improve the performance, security, and reliability of the certification system 100. In various implementations with multiple ground stations (connected over the network 10), fog computing nodes are located at or near corresponding sensor arrays containing cameras and radio transceivers that monitor the airspace. The sensor data streams can be passed directly to the processing devices 132 in the fog computing node 130 (e.g., without compression), where they are filtered, analyzed, pattern matched, and correlated. The fog computing nodes 130 can make preliminary authentication decisions for each UAV 101 they observe. The fog computing nodes 130 can also compress and encrypt any of their sensor streams for transport to higher order fog computing nodes or into the cloud for more detailed analysis.

In some embodiments, once a fog computing node 130 has determined the identity and flight parameters of a UAV 101 in its region, it securely reports these to higher level fog computing nodes that run air traffic control algorithms for the larger airspace. Fog computing techniques can provide a number of advantages, including better latency, scalability, security, and robustness as compared to traditional cloud computing techniques.

Fog computing techniques can provide the advantage of low latency, leading to good situational awareness and safe management of a large numbers of UAVs operating in close proximity at high speeds. Fog computing techniques can also support stronger cryptography providing information security between the UAV network and the Internet. Fog computing techniques further provide an advantage of being able to make autonomous decisions and continue to operate the airspace safely even if backbone connections to the Internet are lost.

Figure 2:
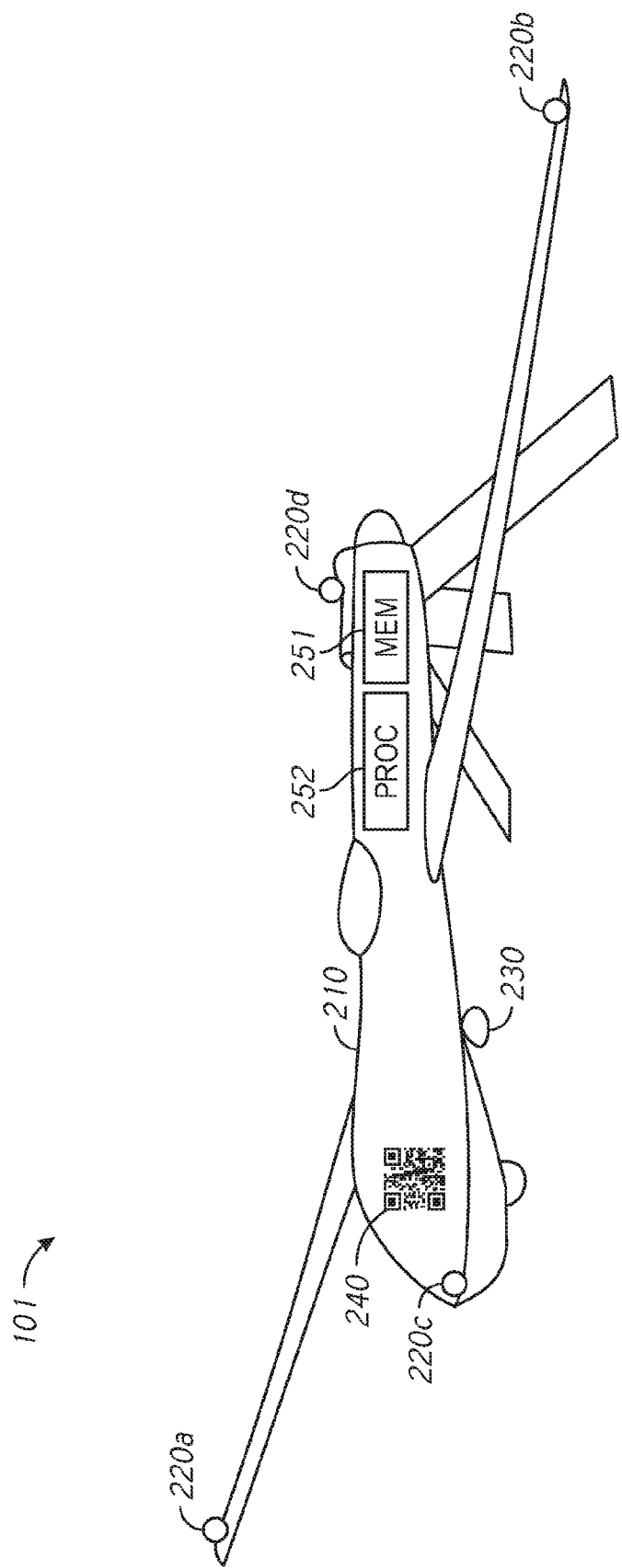
FIG. 2 is a block diagram of a UAV in accordance with some implementations.

FIG. 2 is a block diagram of a UAV 101 in accordance with some implementations. The UAV 101 includes an airframe 210 and one or more indicator lights 220a-220d attached the airframe. As shown in FIG. 2, the indicator lights 220a-220d include an indicator light attached at the end of each wing of the airframe 210, an indicator light attached to the nose of the airframe 210, and an indicator light attached to the tail of the airframe 210. The indicator lights 220a-220d can be, for example, light emitting diodes (LEDs).

The UAV 101 also includes a transceiver 230 (also referred to as a transponder) that wirelessly transmits and receives a radio-frequency (RF) signal encoding a variety of information. For example, the RF signal can encode a UAV identifier of the UAV 101 and/or telemetry information. In various implementations, the UAV 101 transmits telemetry packets periodically (e.g., once a second). In various implementations, the UAV 101 transmits a response to an interrogation message, the response including the UAV identifier.

The UAV 101 has a computer-readable tag 240 displayed on the airframe 210. The computer-readable tag, in various implementations, encodes the UAV identifier of the UAV 101. The computer-readable tag can be, for example, alphanumeric text, a one-dimensional barcode, or a two-dimensional barcode.

The UAV 101 includes a computer system including a processing device 252 and a memory 251. The memory 251 stores instructions that, when executed cause the processing device 252 to retrieve identity information of the UAV 101 (e.g., from the memory 251) and modulate the intensity of one or more of the one or more indicator lights 220a-220d to encode the identity information of the UAV 101. In various implementations, the processing device 252 further modulates the intensity of the indicator lights 220a-220d based on a telemetry of the UAV 101. The processing device 252 can also manage the reception and transmission of messages via the transceiver 230.

Figure 3:
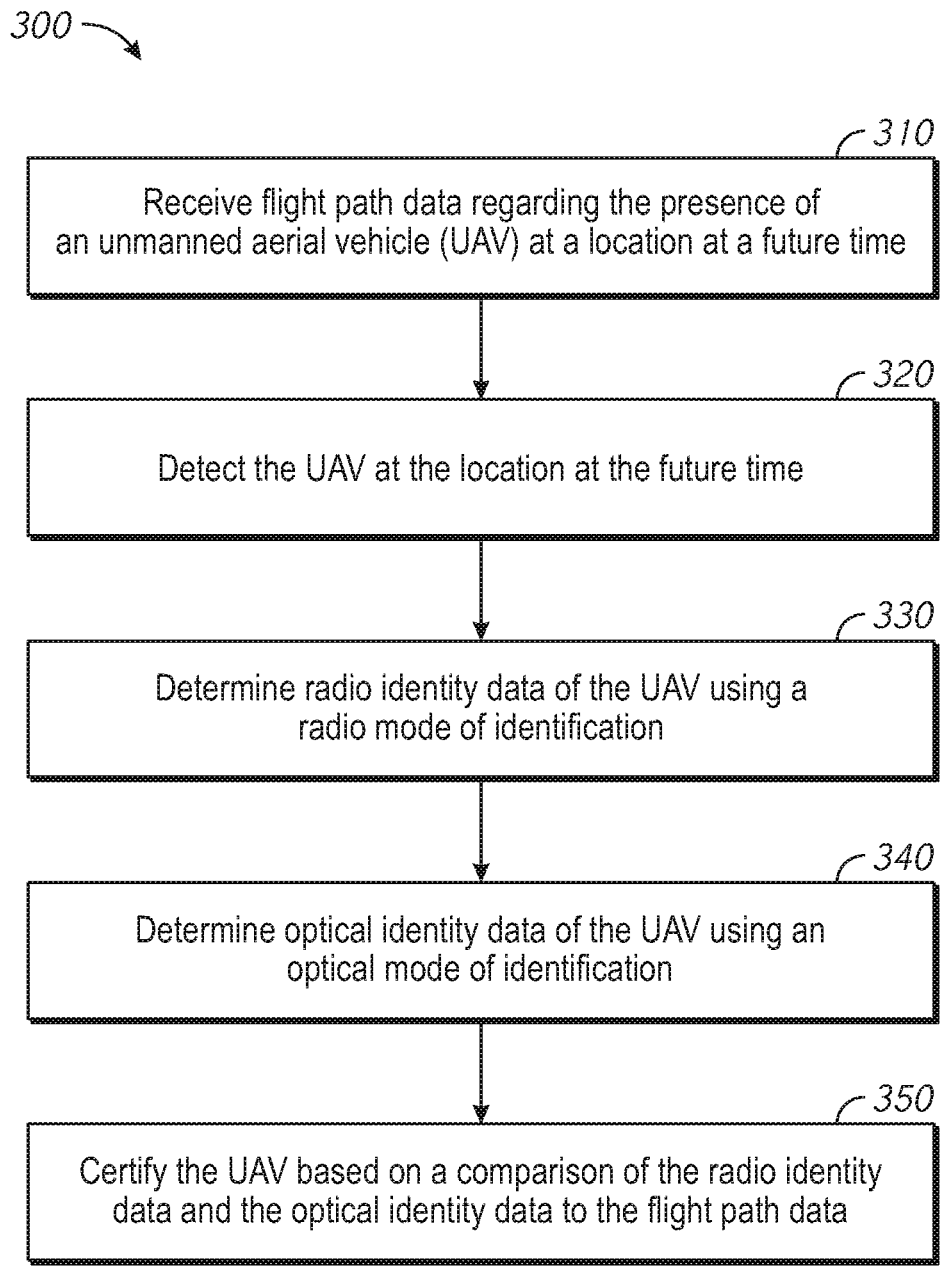
FIG. 3 is a flowchart representation of a method of detecting and certifying a UAV.

FIG. 3 is a flowchart representation of a method 300 of detecting and certifying a UAV. In some implementations (and as detailed below as an example), the method 300 is performed by a ground station, such as the ground station 120 of FIG. 1. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes receiving flight path data regarding the presence of a UAV at a location, detecting the UAV at the location, and certifying the UAV based on a comparison of the flight path data and identity data determined from multiple modes of identification.

The method 300 begins, at block 310, with receiving flight path data regarding the presence of an unmanned aerial vehicle (UAV) at a location at a future time. The flight path data can be received, for example, by a fog computing node associated with the location. The flight path data can be received from a centralized air traffic control system. In various implementations, the flight path data indicates flight plans filed in advanced of the start of the UAV's flight by its operator. To that end, the flight path data can include data regarding the presence of a plurality of UAVs at various future times.

The flight path data can indicate that a particular UAV (with a unique UAV identifier) will be a particular location at a particular future time. The location can be, for example, a GPS location indicating a latitude and longitude. The location can also be, for example, an area, such as the area surrounding the ground station. Similarly, the future time can be a specific time or a time window. The location can specify an altitude or be altitude-agnostic.

At block 320, the ground station detects the presence of the UAV at the location at the future time. Thus, the flight path data is received (at block 310) prior to detecting the UAV (at block 320). The ground station can detect the presence of the UAV at the location at the future time in any of a number of ways, e.g., using any of a number of sensors of a sensor array. In various implementations, the ground station detects the UAV using a camera, a microphone, a transceiver, a proximity sensor (e.g., radar), or any other sensor.

At block 330, the ground station determines radio identity data of the UAV using a radio mode of identification. Two radio modes of identification are described in detail above.

The ground station can use either (or both) of those radio modes of identification or another radio mode of identification to determine the radio identity data.

In some embodiments, the ground station determines the radio identity data of the UAV using the radio mode of identification by receiving one or more telemetry packets (which can be periodically and automatically transmitted) by the UAV. Each one of the one or more telemetry packets can include a UAV identifier of the UAV and the radio identity data determined by the ground station can be the included UAV identifier. As noted above, the telemetry packets can further include at least one of a position of the UAV, an altitude of the UAV, a speed of the UAV, a direction of the UAV, or other telemetry information.

In some embodiments, the ground station determines the radio identity data of the UAV using the radio mode of identification by transmitting an interrogation message to the UAV and receiving a response to the interrogation message. The response to the interrogation message can include a UAV identifier of the UAV and the radio identity data determined by the ground station can be the included UAV identifier. If a directional antenna is used, the bearing and azimuth of the received signal can be included in the response.

At block 340, the ground station determines optical identity data of the UAV using an optical mode of identification. Two optical modes of identification are described in detail above. The ground station can use either (or both) of those optical modes of identification or another optical mode of identification to determine the optical identity data.

In some embodiments, the ground station determines the optical identity data of the UAV using an optical mode of identification by detecting a computer-readable tag in an image of the UAV and decoding the computer-readable tag to determine a UAV identifier of the UAV. The optical identity data determined by the ground station can be the decoded UAV identifier. The computer-readable tag can include at least one of alphanumeric text, a one-dimensional barcode, or a two-dimensional barcode.

In some embodiments, the ground station determines the optical identity data of the UAV using an optical mode of identification by detecting one or more modulated lights streams from the UAV and demodulating the one or more modulated light streams to determine a UAV identifier of the UAV. The optical identity data determined by the ground station can be the UAV identifier from the demodulated light stream.

In some implementations, the ground station determines radio identity data (at block 330) and/or determines optical identity data (at block 340) by decrypting encrypted data. In various implementations, the telemetry packets, the response to the interrogation message, or the modulated light streams can be at least partially encrypted, e.g., with an encryption key received with (or derived from) the flight path data which may also be received by the UAV. Similarly, the ground station can decrypt encrypted portions of the telemetry packets, the response to the interrogation message, or the modulated light streams using the encryption key (or a corresponding decryption key) received with (or derived from) the flight path data. Likewise, on the uplink, commands sent to the UAV can be encrypted using an encryption key received with (or derived from) the flight path data and the UAV can decrypt the commands using the encryption key (or a corresponding decryption key) received with (or derived from) the flight path data.

In various implementations, the method 300 includes determining additional identity data of the UAV using an additional mode of identification. The additional identity data can be, for example, additional radio identity data (determined using another radio mode of identification) or additional optical identity data (determined using another optical mode of identification).

In some embodiments, the ground station can determine additional identity data of the UAV using an additional mode of identification by determining audio identity data of the UAV using an audio mode of identification. Thus, the ground station can receive audio from the UAV and determine the additional identity data (e.g., the audio identity data) from the audio. The audio can be, for example a digitally modulated audio stream (at audible, subsonic, or ultrasonic frequencies) encoding a UAV identifier of the UAV. The UAV can generate the digitally modulated audio stream by, for example, modulating the intensity of an engine (and, thus, an engine sound intensity or frequency) or by using a speaker.

In some embodiments, the ground station can determine additional identity data of the UAV using an additional mode of identification by determining position identity data of the UAV using a position mode of identification. Thus, the ground station can determine a plurality of positions of the UAV at a plurality of times and determine the additional identity data (e.g., the position identity data) based on the plurality of positions at the plurality of times. The UAV can, for example, digitally modulate its altitude (or direction) over time to encode data, such as a UAV identifier.

At block 350, the ground station certifies the UAV based on a comparison of the radio identity data and the optical identity data (and, in some embodiments, additional identity data) to the flight path data. Thus, the ground station determines whether the identity information derived from observing the UAV with one or more sensors (at the location at the time) matches the expected identity information received as flight path data for the UAV (at the location at the time). A particular implementation of certifying the UAV is described below is respect to FIG. 4.

Figure 4:
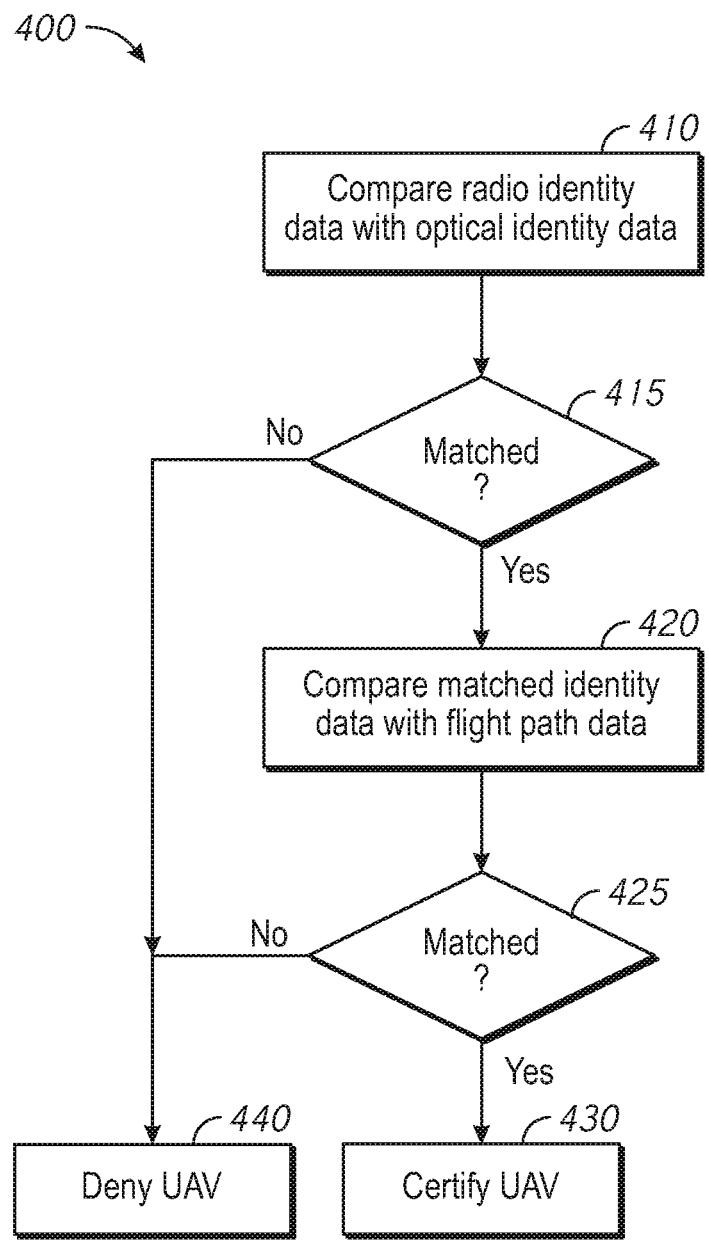
FIG. 4 is a flowchart representation of a method of certifying a UAV.

FIG. 4 is a flowchart representation of a method 400 of certifying a UAV. In some implementations (and as detailed below as an example), the method 400 is performed by a ground station, such as the ground station 120 of FIG. 1, or a fog computing node thereof. In some implementations, the method 400 is performed by processing logic, including hardware, firmware, software, or a combination thereof. In some implementations, the method 300 is performed by a processor executing code stored in a non-transitory computer-readable medium (e.g., a memory). Briefly, the method 400 includes comparing identity data determined by multiple modes of identification and comparing matched identity data to flight path data.

The method 400 begins, at block 410, with the ground station comparing radio identity data (determined by a radio mode of identification) with optical identity data (determined by an optical mode of identification). If the ground station determines (at block 415) that the radio identity data matches the optical identity data, the ground station authenticates the UAV based on the radio identity data matching the optical identity data and the method proceeds to block 420.

At block 420, the ground station compares the matched identity data (either the radio identity data or the optical identity data) to flight path data received by the ground station. If the ground station determines (at block 425) that the matched identity data matches the flight path data to within a pre-specified tolerance, the ground station authorizes the UAV based on the matched identity data matching the flight path data and the method proceeds to block 430.

At block 430, the ground station certifies the UAV as being both authenticated (having a true identity) and authorized (to be in the location at the time according to the flight path data). In some implementations, the ground station certifies the UAV by transmitting a certification via a network, e.g., to another portion of a certification system or an air traffic control system.

If the ground station determines that the radio identity data does not match the optical identity data (at block 415) or determines that the matched identity data does not match the flight path data (at block 425), the method 400 proceeds to block 440 where the ground station denies certification of the UAV. In some implementations, the ground station denies certification of the UAV by transmitting a denial of certification via a network, e.g., to another portion of a certification system or an air traffic control system. Uncertified UAVs, especially those operating near sensitive installations, can pose a security and safety risk. Thus, in various implementations a denial of certification (along with information indicative of the UAV's last known position derived from sensor observations) can be forwarded to authorities in order to more closely monitor the suspicious UAV, and perhaps take countermeasures against its continued operation.

Figure 5:
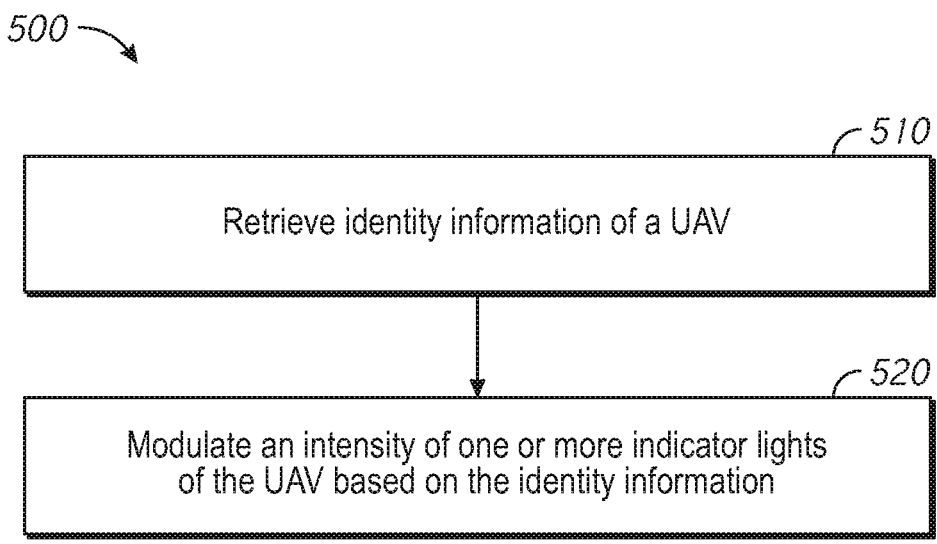
FIG. 5 is a flowchart representation of a method of optically transmitting identity information of a UAV.

FIG. 5 is a flowchart representation of a method 500 of optically transmitting identity information of a UAV. In some implementations (and as detailed below as an example), the method 500 is performed by a UAV, such as the UAV 101 of FIG. 2. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes retrieving identity information of a UAV and modulating an intensity of one or more indicator lights of the UAV based on the identity information.

The method 500 begins, at block 510, with the UAV retrieving identity information of the UAV. The identity information can include, for example, a unique UAV identifier. The UAV can retrieve the identity information from a memory.

At block 520, the UAV modulates the intensity and/or color of one or more indicator lights of the UAV based on the identity information. In some implementations, the UAV digitally modulates the intensity of the indicator lights. For example, the UAV can set the intensity of an indicator light to a first value (e.g., full brightness) for a time slot to indicate a digital '1' and set the intensity of the indicator light to a second value (e.g., half brightness or off) for a time slot to indicate a digital '0'. In some implementations, the UAV can set the intensity of the indicator light to any of more than two values to transmit more than a single bit each time slot. In various implementations, the time slot can be approximately $\frac{1}{120}$, $\frac{1}{60}$, $\frac{1}{30}$, or $\frac{1}{15}$th seconds. These relatively slow symbol intervals can allow conventional video cameras with conventional frame rates to record the full bit pattern of a message in a series of frames.

In some implementations, the UAV digitally modulates the color of the indicators lights. For example, red, green and blue LEDs on the UAV can each be modulated with a concurrent bit stream, and color cameras on the ground can receive these color channels. If more sophisticated receiving equipment were used, the LEDs typical of UAV marker lights can be modulated at a much higher data rate (e.g., several megabits per second) to convey much more information. The receiving equipment can include, for example, a steerable telescope with a sensitive high speed photo receiver at its focus.

In some implementations, the UAV modulates the intensity of the one or more indicator lights based on other information, such as a telemetry of the UAV or an encryption key received as part of a flight path certificate.

In various implementations, the optically transmitted information can be received by various systems or devices including a video camera. Thus, in one embodiment, a smartphone device can execute a mobile device application that can detect the modulated light stream in a video of a UAV taken with a video camera of the smartphone device, demodulate the light stream to determine identification information, and present the identification information on a screen of the smartphone device. Determining the identification information can include retrieving (e.g., via the Internet) additional information based on the information in the modulated light stream. This allows any citizen observing a UAV to use their smartphone application to take a short video of it, decode its optical bit stream, and verify with central air traffic control authorities that the UAV is correctly authorized.

Figure 6:
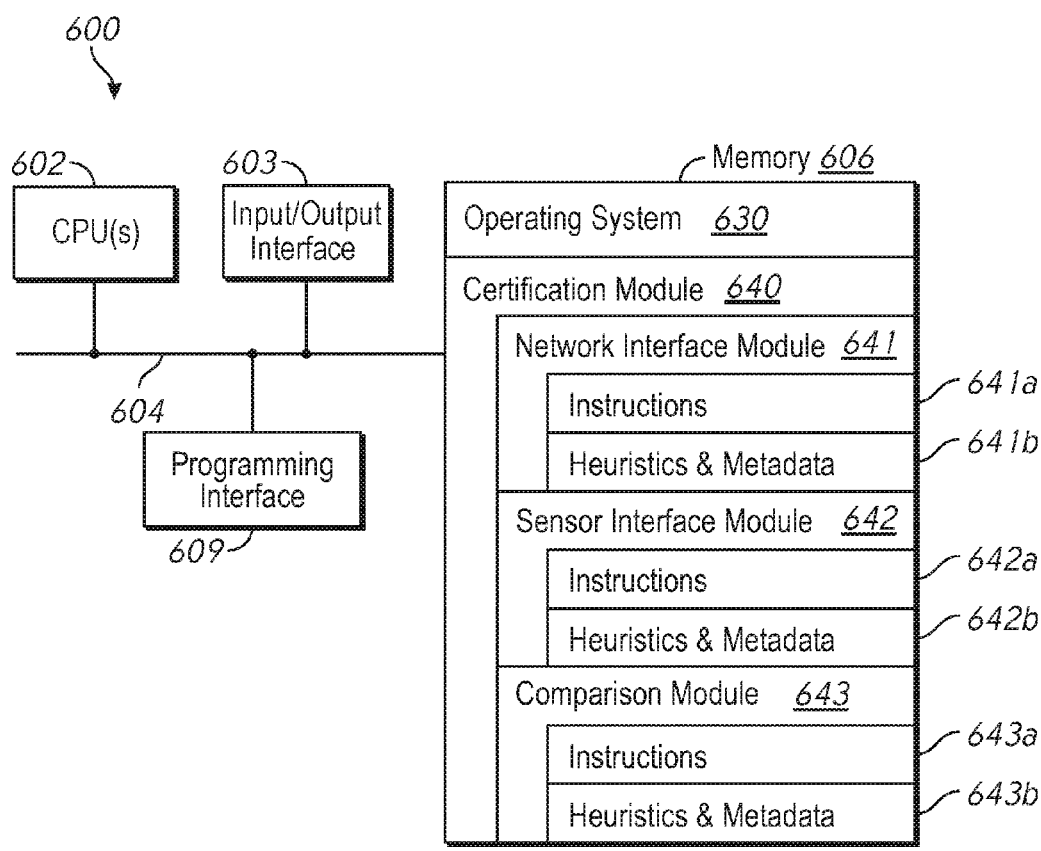
FIG. 6 is a block diagram of a computing device in accordance with some implementations.

FIG. 6 is a block diagram of a computing device 600 in accordance with some implementations. In some implementations, the computing device 600 corresponds to the ground station 110 of FIG. 1 (or the fog computing node 130 thereof) and performs one or more of the functionalities described above with respect to the ground station 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more input/output interfaces 603 (e.g., a network interface and/or a sensor interface), a memory 606, a programming interface 609, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and a certification module 640. In some implementations, one or more instructions are included in a combination of logic and non-transitory memory. The operating system 630 includes procedures for handling various basic system services and for performing hardware dependent tasks. In some implementations, the certification module 640 is configured to detect and certify an UAV. To that end, the certification module 640 includes a network interface module 641, a sensor interface module 642, and a comparison module 643.

In some implementations, the network interface module 641 is configured to receive flight path data regarding the presence of an unmanned aerial vehicle (UAV) at a location at a future time. To that end, the network interface module 641 includes a set of instructions 641a and heuristics and metadata 641b. In some implementations, the sensor interface module 642 is configured to detect the presence of the UAV at the location at the future time. In some implementations, the sensor interface module 642 is configured to determine radio identity data of the UAV using a radio mode of identification and determine optical identity data of the UAV using an optical mode of identification. To that end, the sensor interface module 642 includes a set of instructions 642a and heuristics and metadata 642b. In some implementations, the comparison module 643 is configured to certify the UAV based on a comparison of the radio identity data and the optical identity data to the flight path data. To that end, the comparison module 643 includes a set of instructions 643a and heuristics and metadata 643b.

Although the certification module 640, the network interface module 641, the sensor interface module 642, and the comparison module 643 are illustrated as residing on a single computing device 600, it should be understood that in other embodiments, any combination of the certification module 640, the network interface module 641, the sensor interface module 642, and the comparison module 643 reside in separate computing devices in various implementations. For example, in some implementations each of the certification module 640, the network interface module 641, the sensor interface module 642, and the comparison module 643 reside on a separate computing device or in the cloud.

Figure 7:
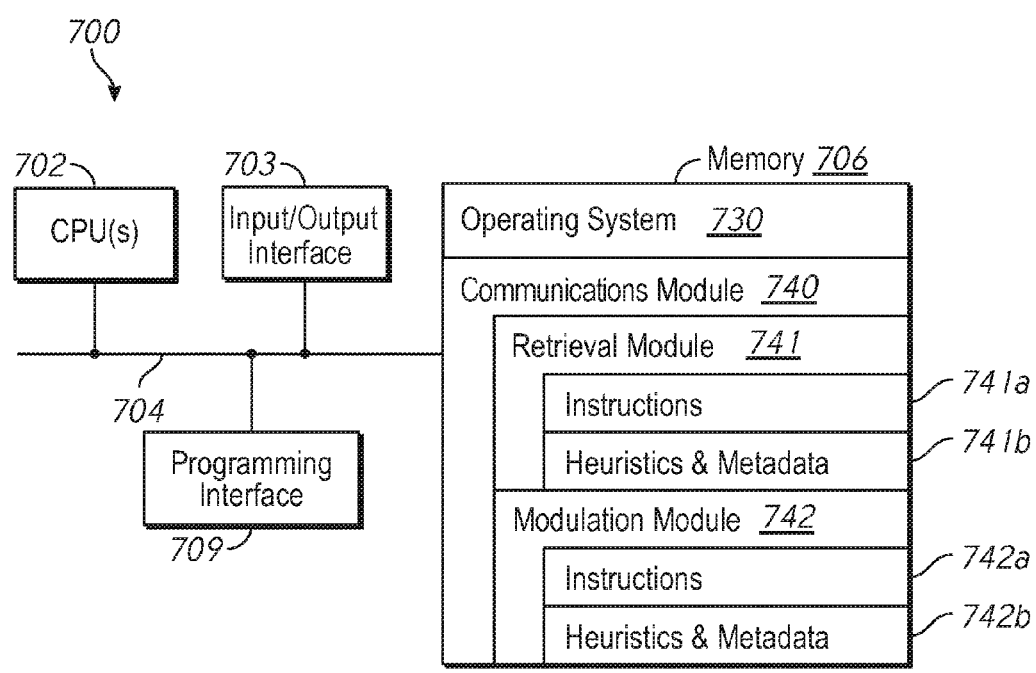
FIG. 7 is block diagram of another computing device in accordance with some implementations.

FIG. 7 is block diagram of another computing device 700 in accordance with some implementations. In some implementations, the computing device 700 corresponds to the UAV 101 of FIG. 2 (or the computing system thereof) and performs one or more of the functionalities described above with respect to the UAV 101. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more input/output interfaces 703 (e.g., a network interface), a memory 706, a programming interface 709, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730 and a transmission module 740. In some implementations, one or more instructions are included in a combination of logic and non-transitory memory. The operating system 730 includes procedures for handling various basic system services and for performing hardware dependent tasks. In some implementations, the communications module 740 is configured optically transmit data. To that end, the communications module 740 includes a retrieval module 741 and a modulation module 742.

In some implementations, the retrieval module 741 is configured to retrieve identity information of a UAV. To that end, the retrieval module 741 includes a set of instructions 741a and heuristics and metadata 741b. In some implementations, the modulation module 742 is configured to modulate one or more indicator lights of the UAV based on the identity information. To that end, the modulation module 742 includes a set of instructions 742a and heuristics and metadata 742b.

Although the communications module 740, the retrieval module 741, and the modulation module 742 are illustrated as residing on a single computing device 700, it should be understood that in other embodiments, any combination of the communications module 740, the retrieval module 741, and the modulation module 742 reside in separate computing devices in various implementations. For example, in some implementations each of the communications module 740, the retrieval module 741, and the modulation module 742 reside on a separate computing device or in the cloud.

Moreover, FIGS. 6 and 7 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 6 and 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
receiving flight path data regarding the presence of an unmanned aerial vehicle (UAV) at a location at a future time;
detecting the presence of the UAV at the location at the future time;
determining, by one or more processors, radio identity data of the UAV using a radio mode of identification applied to one or more radio-frequency data signals received from the UAV;
determining, by the one or more processors, optical identity data of the UAV using an optical mode of identification applied to one or more images of the UAV;
comparing the radio identity data and the optical identity data;
comparing the radio identity data or the optical identity data to the flight path data; and
certifying the UAV based on the comparisons.

2. The method of claim 1, wherein the flight path data includes data regarding the presence of a plurality of UAVs at various future times.

3. The method of claim 1, wherein determining the radio identity data of the UAV using a radio mode of identification includes receiving one or more telemetry packets from the UAV, each of the one or more telemetry packets including a UAV identifier of the UAV.

4. The method of claim 3, wherein each of the one or more telemetry packets furthers includes at least one of a position of the UAV, an altitude of the UAV, a speed of the UAV, a direction of the UAV, a type of the UAV, or a payload of the UAV.

5. The method of claim 1, wherein determining the radio identity data of the UAV using a radio mode of identification includes transmitting an interrogation message to the UAV and receiving a response to the interrogation message from the UAV, the response to the interrogation message including a UAV identifier of the UAV.

6. The method of claim 1, wherein determining the optical identity data of the UAV using an optical mode of identification includes detecting a computer-readable tag in an image of the UAV and decoding the computer-readable tag to determine a UAV identifier of the UAV.

7. The method of claim 6, wherein the computer-readable tag includes at least one of alphanumeric text, a one-dimensional barcode, or a two-dimensional bar code.

8. The method of claim 1, wherein determining optical identity data of the UAV using an optical mode of identification includes detecting one or more modulated light streams in a plurality of images of the UAV and demodulating the one or more modulated light streams to determine a UAV identifier of the UAV.

9. The method of claim 1, further comprising determining additional identity data of the UAV using an additional mode of identification, wherein certifying the UAV is further based on the comparison of the additional identity data to the flight path data.

10. The method of claim 1, wherein the additional identity data is at least one of additional radio identity data or additional optical identity data.

11. The method of claim 1, wherein determining additional identity data of the UAV using an additional mode of identification includes receiving audio of the UAV and determining the additional identity data from the audio.

12. The method of claim 1, wherein determining additional identity data of the UAV using an additional mode of identification includes determining a plurality of positions of the UAV at a plurality of times and determining the additional identity data based on the plurality of positions at the plurality of times.

13. The method of claim 1, wherein certifying the UAV includes authenticating the UAV based on the radio identity data matching the optical identity data.

14. The method of claim 1, wherein certifying the UAV includes authorizing the UAV based on the radio identity data and the optical identity data matching the flight path data.

15. The method of claim 1, wherein determining the radio identity data of the UAV or determining the optical identity data of the UAV includes decrypting encrypted data.

16. A system comprising:
a network interface;
one or more processors; and
a non-transitory memory comprising instructions that when executed cause the one or more processors to perform operations comprising:
receiving, via the network interface, flight path data regarding the presence of an unmanned aerial vehicle (UAV) at a location at a future time;
detecting the UAV at the location at the future time;
determining radio identity data of the UAV using a radio mode of identification applied to one or more radio-frequency data signals received from the UAV;
determining optical identity data of the UAV using an optical mode of identification applied to one or more images of the UAV;

comparing the radio identity data and the optical identity data;

comparing the radio identity data or the optical identity data to the flight path data, and certifying the UAV based on the comparisons.

17. The system of claim 16, further comprising a radio-frequency antenna, wherein determining the radio identity data of the UAV using a radio mode of identification includes receiving, via the radio-frequency antenna, a telemetry packet from the UAV or an interrogation response from the UAV.

18. The system of claim 16, further comprising a camera, wherein determining the optical identity data of the UAV using an optical mode of identification includes analyzing one or more images of the UAV taken with the camera.

19. An unmanned aerial vehicle (UAV) comprising:
an airframe;
one or more indicator lights;
one or more processors; and
a non-transitory memory comprising instructions that when executed cause the one or more processors to perform operations comprising:
retrieving identity information corresponding to an identity of the UAV; and
modulating at least one of an intensity or a color of at least one of the one or more indicator lights based on the identity information for optically communicating the identity of the UAV.

20. The UAV of claim 19, wherein modulating the intensity of the one or more of the one or more indicator lights is further based on a telemetry of the UAV.

* * * * *